(12) United States Patent
Kim et al.

(10) Patent No.: US 9,751,214 B2
(45) Date of Patent: Sep. 5, 2017

(54) APPARATUS FOR RETURNING OF ROBOT AND RETURNING METHOD THEREOF

(71) Applicant: SAMSUNG ELECTRONICS CO., LTD., Suwon-si, Gyeonggi-do (KR)

(72) Inventors: Ji-min Kim, Seoul (KR); No-san Kwak, Suwon-si (KR); Shin Kim, Hwaseong-si (KR); Kyung-shik Roh, Seongnam-si (KR); Soon-yong Park, Bucheon-si (KR); Suk-june Yoon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/934,320

(22) Filed: Nov. 6, 2015

(65) Prior Publication Data

US 2016/0229060 A1    Aug. 11, 2016

(30) Foreign Application Priority Data

Feb. 6, 2015    (KR) .......................... 10-2015-0018878

(51) Int. Cl.
*G05B 19/04*    (2006.01)
*B25J 9/16*    (2006.01)
(Continued)

(52) U.S. Cl.
CPC .......... *B25J 9/1694* (2013.01); *A47L 11/4011* (2013.01); *B25J 5/00* (2013.01);
(Continued)

(58) Field of Classification Search
CPC combination set(s) only.
See application file for complete search history.

(56) References Cited

U.S. PATENT DOCUMENTS 5,400,244 A * 3/1995 Watanabe ............ G05D 1/0242
180/404
5,652,489 A * 7/1997 Kawakami ........... G05D 1/0242
318/568.12
(Continued)

FOREIGN PATENT DOCUMENTS

CN    103948353    7/2014
EP    1 760 564 A2    3/2007
(Continued)

OTHER PUBLICATIONS

European Search Report issued on Jun. 14, 2016 in corresponding European Patent Application No. 15 18 8640.5.

*Primary Examiner* — Jonathan L Sample
(74) *Attorney, Agent, or Firm* — Staas & Halsey LLP

(57) ABSTRACT

An apparatus for returning of robot and a returning method thereof are provided, in which the apparatus for returning of robot includes a signal transmitter which is disposed on a charging station and transmits a single front signal and a plurality of distance signals including first, second and third distance signals, a signal receiver which is disposed on the robot and includes a plurality of receiving sensors to receive any one among the single front signal and one among the plurality of distance signals, and a controller which calculates an angle of the charging station by using one among the received single front signal and the plurality of received distance signals and controls the driving so that the robot can return to the charging station by using the calculated angle of the charging station.

19 Claims, 14 Drawing Sheets

(51) Int. Cl.

| | | |
|---|---|---|
| *A47L 11/40* | (2006.01) | |
| *G05D 1/02* | (2006.01) | |
| *B25J 5/00* | (2006.01) | |
| *B25J 11/00* | (2006.01) | |
| *B25J 19/00* | (2006.01) | |
| *B60L 11/18* | (2006.01) | |

(52) U.S. Cl.
CPC .......... *B25J 9/1664* (2013.01); *B25J 9/1674* (2013.01); *B25J 11/0085* (2013.01); *B25J 19/005* (2013.01); *B60L 11/1824* (2013.01); *B60L 11/1838* (2013.01); *G05D 1/0225* (2013.01); *G05D 1/0242* (2013.01); *A47L 2201/022* (2013.01); *A47L 2201/04* (2013.01); *G05D 2201/0203* (2013.01); *Y10S 901/01* (2013.01)

(56) References Cited

U.S. PATENT DOCUMENTS

| | | | | |
|---|---|---|---|---|
| 6,850,024 B2* | 2/2005 | Peless | ................. | A01D 34/008 318/568.12 |
| 7,386,163 B2* | 6/2008 | Sabe | ......................... | G06T 7/97 348/118 |
| 8,271,133 B2* | 9/2012 | Park | ....................... | G05D 1/027 700/253 |
| 9,452,526 B2* | 9/2016 | Jeong | .................... | B25J 9/0003 |
| 2002/0156556 A1* | 10/2002 | Ruffner | ............... | A01B 69/008 701/23 |
| 2005/0021178 A1* | 1/2005 | Kim | ....................... | G01S 11/16 700/245 |
| 2005/0021179 A1* | 1/2005 | Kim | ......................... | G01S 5/30 700/245 |
| 2005/0137748 A1* | 6/2005 | Kim | ......................... | G01S 1/80 700/245 |
| 2005/0221840 A1* | 10/2005 | Yamamoto | ........... | G05D 1/0242 455/456.3 |
| 2005/0283309 A1* | 12/2005 | Sonoura | ................. | G01S 15/89 340/8.1 |
| 2006/0217838 A1* | 9/2006 | Sugino | ................ | G05D 1/0251 700/245 |
| 2007/0096676 A1* | 5/2007 | Im | ....................... | G05D 1/0225 318/587 |
| 2007/0118248 A1* | 5/2007 | Lee | ...................... | G05D 1/0225 700/245 |
| 2008/0009984 A1* | 1/2008 | Lee | ...................... | G05D 1/0225 701/23 |
| 2008/0065266 A1* | 3/2008 | Kim | ...................... | G05D 1/0225 700/245 |
| 2008/0174268 A1* | 7/2008 | Koo | ...................... | A47L 9/2805 320/109 |
| 2009/0315501 A1* | 12/2009 | Li | ......................... | A01D 34/008 318/568.12 |
| 2011/0089891 A1* | 4/2011 | Pai | ....................... | H02J 7/0044 320/107 |
| 2011/0167574 A1* | 7/2011 | Stout | .................... | G05D 1/0219 15/3 |
| 2012/0089253 A1* | 4/2012 | Li | ......................... | G05D 1/0225 700/246 |
| 2012/0116588 A1* | 5/2012 | Lee | ...................... | G05D 1/0225 700/259 |
| 2012/0296511 A1* | 11/2012 | More | ................... | G05D 1/0225 701/26 |
| 2013/0015809 A1* | 1/2013 | Frey | .................... | B60L 11/1824 320/106 |
| 2013/0060379 A1* | 3/2013 | Choe | ..................... | G06N 3/008 700/245 |
| 2013/0116880 A1* | 5/2013 | Shitamoto | ............ | G05D 1/0236 701/25 |
| 2013/0210457 A1* | 8/2013 | Kummetz | ............. | G01S 5/0289 455/456.1 |
| 2013/0214726 A1* | 8/2013 | Teng | .................... | G05D 1/0234 320/107 |
| 2013/0214727 A1* | 8/2013 | Teng | .................... | H02J 7/0052 320/107 |
| 2014/0150820 A1* | 6/2014 | Yoo | ......................... | A47L 9/009 134/6 |
| 2015/0208891 A1* | 7/2015 | Jang | ....................... | A47L 5/225 15/319 |
| 2016/0229060 A1* | 8/2016 | Kim | ..................... | G05D 1/0225 |

FOREIGN PATENT DOCUMENTS

| | | |
|---|---|---|
| KR | 10-0645381 | 11/2006 |
| KR | 10-2009-0111170 A | 10/2009 |
| KR | 10-1437778 | 9/2014 |

* cited by examiner

APPARATUS FOR RETURNING OF ROBOT AND RETURNING METHOD THEREOF

CROSS-REFERENCE TO RELATED APPLICATIONS

This application claims priority from Korean Patent Application No. 10-2015-0018878, filed on Feb. 6, 2015 in the Korean Intellectual Property Office, the disclosure of which is incorporated herein by reference in its entirety.

BACKGROUND

1. Field

Apparatuses and methods consistent with what is disclosed herein relate to a robot for performing the cleaning while auto-driving, and more specifically, to an apparatus for returning of robot to return the robot provided with a rechargeable battery to a charging station for the charging and a returning method thereof.

2. Description of the Related Art

In the related art, a cleaning robot may perform cleaning to absorb dust or exterior materials on the floor while driving within a certain area of a working area without requiring user manipulation. The robot may recognize distances to obstacles such as furniture, office equipment, and walls, which are established within the working area such as within a home or office, through a sensor or a camera. The robot may perform commanded jobs while driving so as not to collide with obstacles by using recognized information.

Such a robot may be provided with a battery that is chargeable with electrical power necessary for the driving. The battery is typically a rechargeable battery that can be charged and used multiple times when the electrical power has been consumed. Thus, the robot may include a charging station and a system so that the rechargeable battery can be connected to and charged with the electrical source when the charging is necessary.

Meanwhile, for the robot to return to the charging station automatically when charging is necessary, the robot should correctly recognize a position of the charging station and correctly connect a connecting socket of the robot to a charging component of the charging station.

For the above, the charging station may transmit certain types of infrared signals for the charge-return. The robot may return to the charging station by performing an operation according to the type of the received signals. In receiving the types of infrared signals for the charge-return according to the consecutive method, problems may arise as the signals may not be received correctly or reflecting signals from the wall or the obstacle may be received. In this case, the robot may have a problem such as moving farther away from the charging station instead of closer to the charging station.

SUMMARY

Additional aspects and/or advantages will be set forth in part in the description which follows and, in part, will be apparent from the description, or may be learned by practice of the invention.

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to an embodiment, a technical objective is to provide an apparatus for returning of robot in which a robot searches signals consecutively while performing different driving with respect to each other according to a plurality of distance signals and a single front signal.

Further, another technical objective is to provide an apparatus for returning of robot in which the robot continues to calculate the direction of a charging station and drives in order to search signals consecutively.

According to an embodiment, an apparatus for returning of a robot may include a signal transmitter disposed on a charging station to transmit a single front signal and a plurality of distance signals comprising first, second and third distance signals in which the transmission distance consecutively increases, a signal receiver disposed on the robot and comprising a plurality of receiving sensors to receive one among the single front signal and the plurality of distance signals, and a controller configured to calculate an angle of the charging station by using one among the single front signal and the plurality of distance signals as received, and control the driving so that the robot returns to the charging station by using the calculated angle of the charging station. The controller controls a driver for the robot to drive backward from the direction of the charging station when the first distance signal is received by at least one among the plurality of receiving sensors provided on the robot, or for the robot to drive toward the direction of the charging station when the third distance signal is received. The controller may control the driver for the robot to perform front-turn driving toward a direction corresponding to a preset angle based on the direction of the charging station and search the front signal when the second distance signal is received by at least one among the plurality of receiving sensors. The controller may control the driver for the robot to drive toward the direction of the charging station and connect to the charging station when the front signal is received by at least one among the plurality of receiving sensors.

The plurality of receiving sensors may be arranged on a boundary of the robot in a symmetry from left to right based on a front of the robot.

The plurality of receiving sensors may have preset reception ranges.

The plurality of receiving sensors may be arranged on the boundary of the robot at equal intervals from each other.

The plurality of receiving sensors may include a pair of front receiving sensors arranged in parallel on the front of the robot in which the reception ranges overlap with each other.

When a plurality of distance signals are received by some among the plurality of receiving sensors, a distance signal having the smallest transmission angle and distance in terms of the size are only received, and when a plurality of distance signals and the single front signal are received by some among the plurality of receiving sensors, the single front signal is only received.

The front signal, and the first, the second and the third distance signals may have different codes with respect to each other, the front signal may be transmitted from the center of the charging station toward the front, and the first, the second and the third distance signals may be respectively formed to be symmetrical from the left to the right based on the front signal.

The first and the second distance signals may have different codes between the signals formed on one side and the signals formed on other side based on the front signal.

The third distance signal may have a transmission angle covering both sides of the charging station.

The first to the third distance signals may have overlapping areas with respect to each other, and the controller may select the distance signal having the smallest transmission distance when at least two distance signals are received by at least one among the plurality of receiving sensors, select the front signal only when any one among the plurality of distance signals and the front signal are received, and control the driver according to the selected signal.

The front signal and the plurality of distance signals may be infrared signals.

In one embodiment, a method for returning of a robot is provided, which may include determining whether returning conditions are met or not according to a charging amount of a battery or an amount of absorbed dust, when the returning conditions are met, searching any one among a single front signal transmitted from a charging station and a plurality of distance signals comprising first to third distance signals in which the transmission distance consecutively increases, driving the robot backward from a direction of the charging station when the first distance signal is received by at least one among a plurality of receiving sensors provided on the robot, or driving the robot toward the direction of the charging station when the third distance signal is received, front-turn driving the robot toward a direction corresponding to a preset angle ($\theta_o$) based on the direction of the charging station and searching the front signal when the second distance signal is received by at least one among the plurality of receiving sensors, and driving the robot toward the direction of the charging station and connecting the robot to the charging station when the front signal is received by at least one among the plurality of receiving sensors.

The first to the third distance signals may have overlapping areas with respect to each other, the distance signal having the smallest transmission angle and distance may be selected when at least two distance signals are received by at least one among the plurality of receiving sensors, or the front signal may only be selected when any one among the plurality of distance signals and the front signal is received and driving is performed according to the selected signal.

The direction of the charging station may be determined according to an angle of the charging station calculated by an arrangement angle from a front center line of the robot to the receiving sensor which receives the selected signal.

The direction of the charging station may be repeatedly determined at preset calculating period from a time when at least one among the plurality of receiving sensors provided on the robot receives the single front signal and any one among the plurality of distance signals including the first to the third distance signals to a time when the robot connects to the charging station.

The plurality of receiving sensors may be arranged on the boundary of the robot, in a symmetry from left to right based on a front of the robot, and the angle ($\theta_s$) of the charging station is calculated according to a following mathematical formula 1

$$\theta_s = \frac{\sum_{i=1}^{N} \theta_i f(i)}{\sum_{i=1}^{N} f(i)}$$ [Formula 1]

where N is number of the receiving sensors, i is serial number of the receiving sensors, $\theta_i$ is angle of a receiving sensor at i times which is measured clockwise from the front center line of the robot if i is odd number, or angle of a receiving sensor at i times which is measured counter-clockwise from the front center line of the robot if i is even number, f(i)=1 if the receiving sensor at i times receives the selected signals, and f(i)=0 if the receiving sensor at i times does not receive the selected signals, wherein $\theta_i$ is $-180° \leq \theta_i \geq 180°$ and $\theta_s$ is $-180° \leq \theta_s \leq 180°$.

The preset angle ($\theta_o$) may be disposed within a range from $-180°$ to $+180°$, and when the second distance signal is received by some among the plurality of receiving sensors provided on the robot, the robot may perform a front-straight driving if the angle of the charging station is uniform to the preset angle in terms of size, and the direction is different from each other.

The front-turn driving may be performed according to a preset angular velocity corresponding to the calculated angle of the charging station.

The front-turn driving may be performed according to an angular velocity proportional to a size of the calculated angle of the charging station.

According to an embodiment, a docking station for a robot may include a first signal transmitter to transmit a first docking guide signal having a first transmission angle and a first transmission distance, a second signal transmitter to transmit a second docking guide signal having a second transmission angle and a second transmission distance, a third signal transmitter to transmit a third docking guide signal having a third transmission angle and a third transmission distance, wherein each of the first, second, and third docking guide signals comprise a different identification code for identifying the first, second, and third docking guide signals.

According to an embodiment, a robot cleaning system includes a docking station and a robot cleaner. The docking station may include a signal transmitter disposed on the charging station to transmit a front signal and a plurality of distance signals comprising first, second and third distance signals in which a respective transmission distance of the plurality of distance signals consecutively increases. The robot cleaner may include a plurality of receiving sensors disposed on the robot cleaner to receive the front signal and the plurality of distance signals and a controller configured to calculate an angle of the charging station by using any among the front signal and the plurality of distance signals as received, and to control the driving of the robot so that the robot returns to the charging station using the calculated angle of the charging station. When the plurality of distance signals are received concurrently by one or more receiving sensors among the plurality of receiving sensors, a distance signal having a smallest transmission angle and distance in terms of size is selected from among the plurality of distance signals by the controller and the controller controls the robot according to the selected signal.

BRIEF DESCRIPTION OF THE DRAWINGS

The above and/or other aspects of the present inventive concept will be more apparent by describing certain exemplary embodiments of the present inventive concept with reference to the accompanying drawings, in which.

DETAILED DESCRIPTION

Figure 1:
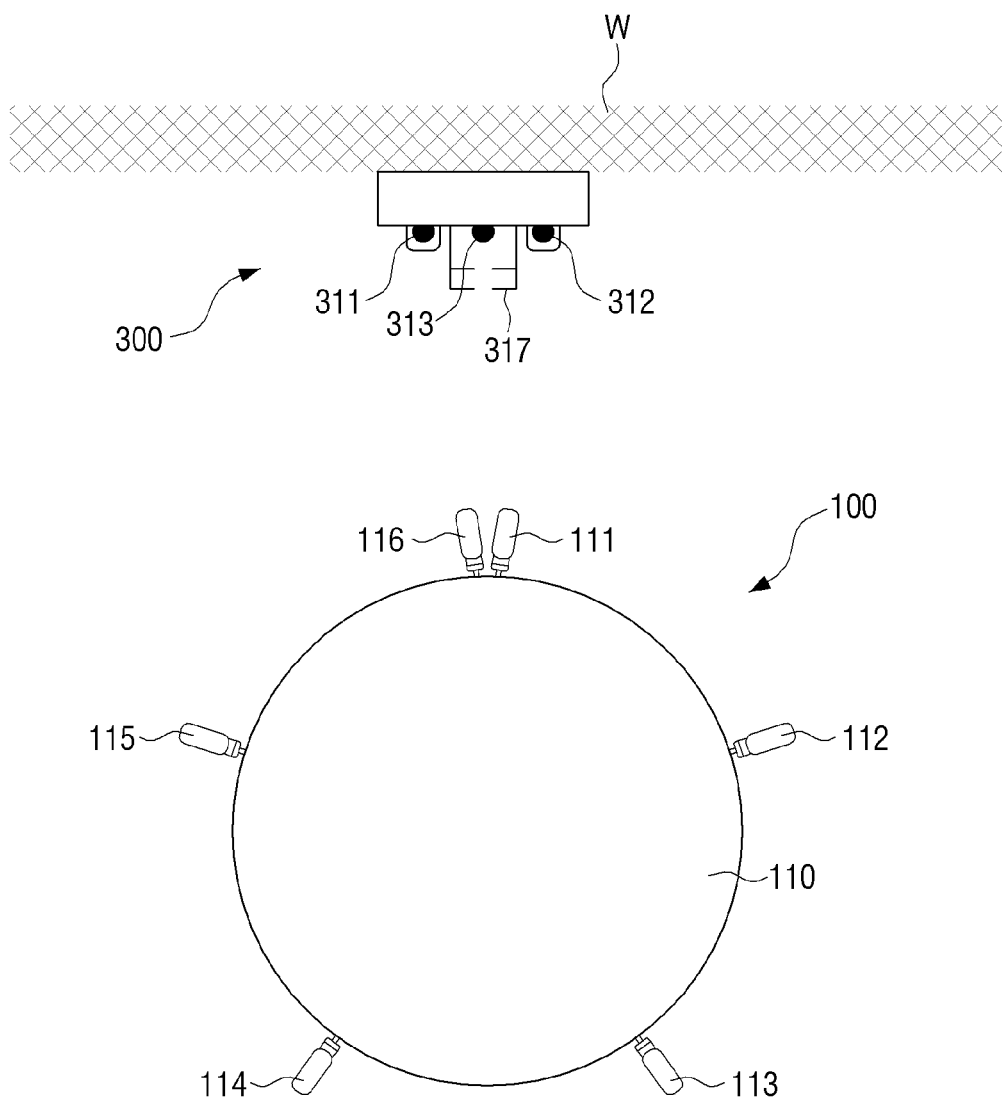
FIG. 1 is a schematic diagram of an apparatus for returning of robot according to an embodiment.

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

Referring to the attached drawings, an apparatus for returning a robot and a returning method thereof will be described in detail below.

Figure 2:
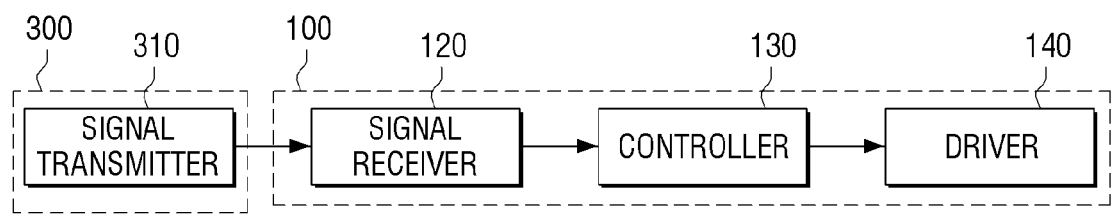
FIG. 2 is a block diagram of the apparatus for returning of robot in FIG. 1.

FIG. 1 is a schematic diagram of an apparatus for returning of a robot according to an embodiment, and FIG. 2 is a block diagram of the apparatus for returning of robot of FIG. 1.

Referring to FIGS. 1 and 2, the apparatus for returning of a robot according to an embodiment includes a signal transmitter 310 disposed at a charging station 300 to transmit returning signals, a signal receiver 120 disposed at a main body 110 of the robot 100 to receive the returning signals transmitted from the signal transmitter 310, a controller configured to control the operation of the robot 100 according to the received signals of the signal receiver 120, and a driver 140.

The signal transmitter 310 may include a first, a second and a third signal transmitter 311, 312, 313 which are disposed at the charging station 300 to transmit a single front signal 313A and a plurality of distance signals including first to third distance signals 311A, 312A, 311B, 312B, 315A having different codes from each other. In an embodiment, the codes may include an identification code for identifying each of the first, second and third signal transmitters. Because the first to the third signal transmitters 311, 312, 313 transmit signals having different codes from each other, the controller 130 may respectively recognize signals transmitted from the first to the third signal transmitters 311, 312, 313 which are received at the signal receiver 120.

According to an embodiment, the first to the third signal transmitters 311, 312, 313 may be disposed on the front side of the charging station 300. Further, the first to the third signal transmitters 311, 312, 313 may be infrared emitting components such as infrared LED, and may transmit a uniform frequency of infrared light in consideration of cost. Thus, the infrared receiver may be applied to the signal receiver 120. The apparatus for returning of the robot cleaner 100 to be externally charged may use the infrared emitting components and the infrared receiver as described herein, which has an advantage in which various transmission angles and transmission distances can be easily implemented with the relatively lower cost.

The infrared signals transmitted from the first to the third signal receivers 311, 312, 313 may have different transmission angles and distances from each other. In an embodiment, robot 100, which receives different codes of infrared signals, is provided, and robot 100 quickly accesses the charging station 300 by using the received signals. For the robot 100 to receive infrared signals from any area of the near field of the charging station 300, the infrared signals transmitted from the first to the third signal receivers 311, 312, 313 should be uniformly or evenly spread out from each other on the front of the charging station 300.

The first and the second signal transmitter 311, 312 may be disposed symmetrically based on the front center of the charging station 300, and may transmit the first to the third distance signals 311A, 312A, 311B, 312B, 315A having different codes from each other. Further, the first and the second signal transmitter 311, 312 may adjust transmission distances of the first to the third distance signals 311A, 312A, 311B, 312B, 315A by adjusting resistance values of signal transmitting circuit in order to transmit the first to the third distance signals 311A, 312A, 311B, 312B, 315A in which the transmission distance increases consecutively. The first and the second signal transmitter 311, 312 may adjust transmission angles of the first to the third distance signals 311A, 312A, 311B, 312B, 315A by using lenses having different refracting angles so that the first to the third distance signals 311A, 312A, 311B, 312B, 315A have different transmission angles from each other. Meanwhile, the first and the second signal transmitters 311, 312 may transmit the third distance signals 315A. Or, the third distance signals 315A may be transmitted by providing another transmitter (not illustrated).

The third signal transmitter 313 may be disposed on the front center of the charging station 300, and may transmit the single front signal 313A having different codes from the codes regarding the plurality of distance signals. Further, the third signal transmitter 313 may adjust transmission angles of the front signal 313A by transmitting the front signal 313A through a slit disposed on the front section of the charging station 300 so that the front signal 313A have much narrower transmission angles compared to the plurality of distance signals. The third signal transmitter 313 may adjust a transmission distance of the front signal 313A by adjusting resistance values of the circuit. Meanwhile, the third signal transmitter 313 may transmit the third distance signals 315A with the first and the second signal transmitters 311, 312, although embodiment is not limited herein. As described above, the third distance signals 315A may be transmitted by providing another signal transmitter (not illustrated).

The driver 140 may include wheels (not illustrated) disposed on both sides of the main body, and a motor (not illustrated) to rotate the wheels. The motor (not illustrated) may rotate each wheel independently forward or backward according to controlling signals of the controller 130. Further, the motor (not illustrated) may rotate the wheels so that the number of rotations of each of the wheels can be different from each other. Thus, the robot 100 may rotate toward the left and the right or drive forward and backward.

Meanwhile, although not illustrated, other components may be provided, such as a dust absorber to absorb dust or exterior materials with airs on the cleaning side where the robot 100 is driving, a storage to store a plurality of data necessary to automatically control the robot 100, e.g., cleaning dimension, driving paths, and position information regarding obstacles and overlapping areas, obstacle receiving sensor to receive obstacles in the driving direction, and path distance extracting sensor.

The controller 130 may perform the cleaning by controlling each component of the robot 100. Meanwhile, when the cleaning is not performed, the controller 130 may charge a rechargeable battery while connecting the robot 100 to the charging station 300, and to standby for the next driving operation. For the above, the controller 130 may receive signals from the signal receiver 120, determine the direction of the charging station 300, and control the driver 140 so that the robot 100 can enter and connect to the charging station 300 quickly and efficiently, which will be explained further below.

Figure 3:
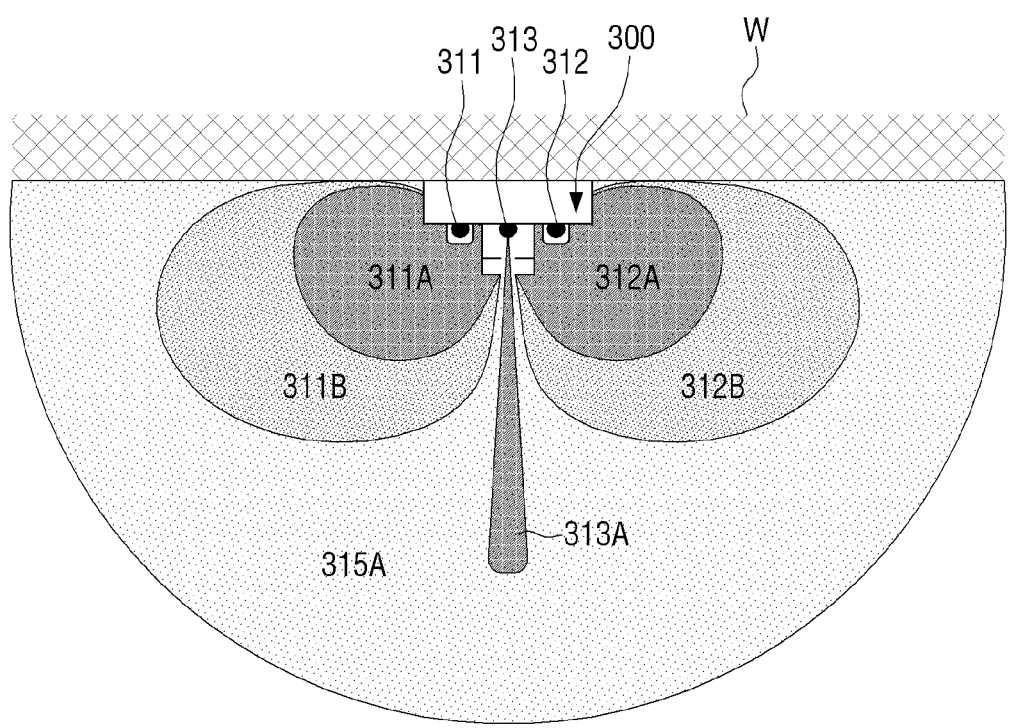
FIG. 3 is a schematic diagram of transmission distance and angle of signals transmitted from a charging station of FIG. 1.

FIG. 3 is a schematic diagram of transmission distances and transmission angles of the signals transmitted from the charging station 300 of FIG. 1.

Referring to FIG. 3, the first to the third distance signals 311A, 312A, 311B, 312B, 315A may be respectively symmetrical from the left to the right with respect to the front signal 313A.

The first distance signals 311A, 312A may include a pair of signals having different codes from each other. Thus, the first distance signals 311A formed on one side of the front signal 313A and the first distance signals 312A formed on the other side of the front signal 313A may have different codes from each other. Specifically, the first distance signals may be constituted with the first left distance signals 311A having different codes from first distance signals 312A and transmitted from the first signal transmitter 311 disposed on one side of the front signal 313A, i.e., on the left side of FIG. 3 and the first right distance signals 312A having different codes from first distance signals 311A and transmitted from the second signal transmitter 312 disposed on the other side of the front signal 313A, i.e., on the right side of FIG. 3.

Like the first distance signals 311A, 312A, the second distance signals 311B, 312B may include a pair of signals having different codes from each other. Specifically, the second distance signals may include the second left distance signals 311B having different codes from second right distance signals 312B and transmitted from the first signal transmitter 311 and second right distance signals 312B having different codes from second left distance signals 311B and transmitted from the second signal transmitter 312.

The third distance signals 315A may be transmitted from the first to the third signals transmitter 311, 312, 313, or from a signal transmitter (not illustrated) provided separately, as described above. Like the first and the second distance signals 311A, 312A, 311B, 312B, the third distance signals 315A may be symmetrical based on the front signal 313A. However, the third distance signals 315A may not be constituted with a pair of signals having different codes from each other, like in the first and the second distance signals 311A, 312A, 311B, 312B.

The first to the third signal transmitters 311, 312, 313 may be constituted to transmit different signals from each other at certain intervals.

The front signal 313A may have different codes from the codes of the distance signals including the first to the third distance signals 311A, 312A, 311B, 312B, 315A.

Meanwhile, the first to the third distance signals 311A, 312A, 311B, 312B, 315A may have different transmission angles and transmission distances from each other.

Specifically, the first left and the first right distance signals 311A, 312A constituting the first distance signals 311A, 312A may be set to be symmetrical based on the front signal 313A and to have the smallest transmission distances, respectively. The first left and the first right distance signals 311A, 312A may have transmission distances in which the signals approaches the wall where the charging station 300 is disposed so that the robot 100 tracking the wall can receive the first left and the first right distance signals 311A, 312A. The transmission angle may be 70° for example, and the transmission distance may be a distance approaching the area where the width and the height are 40 cm respectively, for example. The first distance signals 311A, 312A may be disposed to have a small enough transmission range and distance that the robot 100 may correctly calculate the direction of the charging station 300.

Further, the second left and the second right distance signals 311B, 312B constituting the second distance signals 311B, 312B may be set to be symmetrical based on the front signal 313A, and to respectively have transmission distances larger than the first distance signals 311A, 312A and smaller than the third distance signals 315A. Like the first left and the first right distance signals 311A, 312A described above, the second left and the second right distance signals 311B, 312B may respectively have transmission distances in which the signals approach the wall where the charging station 300 is disposed so that the robot 100 tracking the wall receives the signals. The second left and the second right distance signals 311B, 312B may have the transmission angle of 70° for example, and respectively have the transmission distance approaching the area where the width is 80 cm and the height is 60 cm, for example.

Further, the third distance signals 315A may be set to be symmetrical based on the front signal 313A, and to have the largest transmission angles and distances. Thus, the third distance signals 315A may be set to have the transmission angles including both sides of the charging station 300. Further, the signal may approach the wall where the charging station 300 is disposed so that the robot 100 tracking the wall receives the signals. For example, the third distance signals 315A may have the transmission distance approaching the area where the width and the height are 500 cm, respectively.

Meanwhile, the front signal 313A may be transmitted forward from the front section of the charging station 300, and may be set to have the smallest transmission angle so that the robot 100 tracks the front signal 313A and efficiently connects to the charging station 300. For example, the front signal 313A may have the transmission angle in which the width of the signals is 5 cm and the transmission distance of 100 cm.

The distance signals including the first to the third distance signals 311A, 312A, 311B, 312B, 315A described above and the single front signal 313A may have overlapping areas. Therefore, the robot 100 may receive a plurality of signals concurrently while driving. In this example, the front signal 313A may be first selected by the controller 130 to control the robot 100, as will be explained below. Further, when multiple different signals are received among the plurality of distance signals, other than for the front signal 313A, the distance signals having the smallest transmission distance may be first selected to control the robot 100.

Thus, the apparatus for returning of the robot cleaner 100 according to an embodiment may include a plurality of transmitters having different codes from each other, and may transmit different transmission distances and angles of the signal transmitter 310 to be suitable for each purpose. Therefore, the apparatus for returning the robot may enable the robot 100 to quickly and correctly access to the charging station 300.

Figure 4:
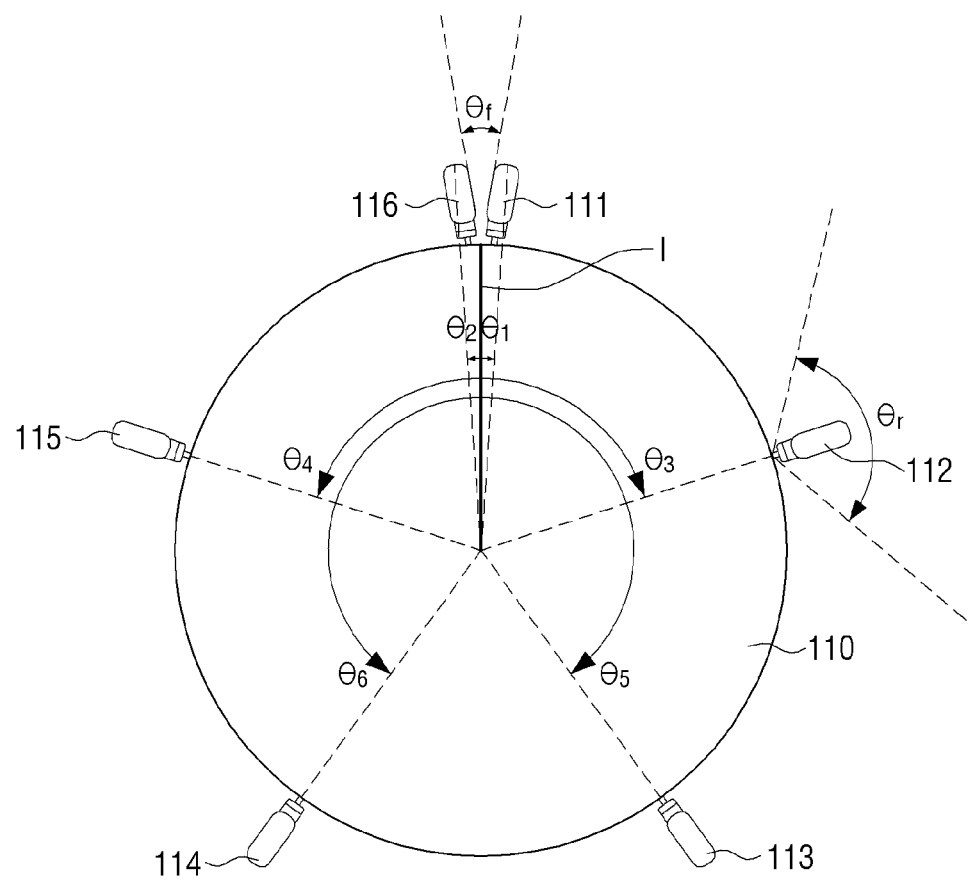
FIG. 4 is a diagram describing arrangement of receiving sensors regarding the robot of FIG. 1.

FIG. 4 is a diagram describing arrangement of the receiving sensors regarding the robot 100 of FIG. 1.

Referring to FIG. 4, the robot 100 according to an embodiment may include the plurality of receiving sensors arranged on the boundary while being symmetrical from the left to the right based on the front. For example, the plurality of receiving sensors may be constituted with six receiving sensors, the first to the sixth receiving sensor 111, 112, 113, 114, 115, 116. Further, based on the front center line of the robot 100, the first, the third and the fifth receiving sensor 111, 112, 113 arranged on the right side and the second, the fourth, and the sixth receiving sensor 116, 115, 114 arranged on the left side may be formed to be symmetrical. Regarding the above configuration, the arrangement angle ($\theta_1$) of the first receiving sensor 111, the arrangement angle ($\theta_2$) of the second receiving sensor 116, the arrangement angle ($\theta_3$) of the third receiving sensor 112, the arrangement angle ($\theta_4$) of the fourth receiving sensor 115, the arrangement angle ($\theta_5$) of the fifth receiving sensor 113, and the arrangement angle ($\theta_6$) of the sixth receiving sensor 114 may respectively have a uniform angle with respect to each other.

The plurality of receiving sensors may be arranged on the boundary of the robot 100, e.g., on an outer circumference of the robot 100, at a uniform interval with respect to each other. For example, regarding the receiving sensors arranged symmetrically on the left side and the right side based on the front center line of the robot 100, $\theta_3$ and $\theta_4$ may be respectively 72°, and $\theta_5$ and $\theta_6$ may be respectively 148°.

Among the plurality of receiving sensors, a pair of the first and the second receiving sensors 111, 116, which are arranged in parallel on the front of the robot 100 may be configured as a pair of the front receiving sensors 111, 116, and symmetrically based on the front center line 1 of the robot 100. However, in another embodiment, the above two receiving sensors may not be arranged at uniform intervals with respect to each other. Thus, the arrangement angle ($\theta_1$) of the first receiving sensor 111, and the arrangement angle ($\theta_2$) of the second receiving sensor 116 may be formed to be much smaller than the arrangement angles of the other receiving sensors. Regarding the above configuration, the front signal 313A having much narrow width may be correctly tracked, and the charging station 300 may be connected, as described below.

Meanwhile, the plurality of receiving sensors may be set to have a uniform reception range. For example, each receiving sensor may have a uniform reception range of about 120°. Therefore, because the receiving sensors arranged on the boundary of the robot 100 at uniform interval may have overlapping reception range, the signals transmitted from a certain direction may be received by more than two receiving sensors.

Meanwhile, a pair of the front receiving sensors 111, 116 may be arranged in parallel and adjacent to the front of the robot 100, and may form certain or predetermined angles with each other. Thus, a pair of the front receiving sensors 111, 116 may have different overlapping reception ranges according to the predetermined size of the angles with respect to each other even though both are arranged in parallel and adjacent to the front side of the robot 100. The overlapping reception range may be narrower, when the angle formed by a pair of the front receiving sensors 111, 116 becomes greater. Therefore, the robot 100 may correctly track the front signal 313A. However, the whole reception range regarding a pair of the front receiving sensors 111, 116 may be also broader, which affects the calculation of the direction of the charging station. On the contrary, the overlapping reception range may be broader when the angle formed by a pair of the front receiving sensors 111, 116 becomes smaller. Thus, the robot 100 may not correctly track the front signal 313A.

Therefore, the reception ranges regarding a pair of the front receiving sensors 111, 116 may be adjusted respectively and used differently from the reception ranges of the other receiving sensors within the scope in which the robot 100 can correctly track the front signal 313A and correctly calculate the direction of the charging station.

The following will explain operation of the apparatus for returning of the robot cleaner 100 to be externally charged according to an embodiment.

The robot 100 may wait for the next driving operation while being connected to a charging component (not illustrated) of the charging station 300. When cleaning command signals are received, the robot 100 may be separated from the charging station 300 and may perform cleaning on the defined area according to user commands or previously programmed commands. The controller 130 may determine whether to meet return conditions according to the charge amount of the battery or the amount of the dust obtained. When the return conditions are met such as when the cleaning has been completed or the battery charge amount has been reduced under standard predetermined level or threshold while performing the cleaning, the controller 130 may start controlling the driver 140 to drive the robot 100 to return to the charging station 300. Thus, the controller 130 may control the driver 140 to search for any one or more among the single front signal 313A transmitted from the charging station 300 and the plurality of distance signals including the first to the third distance signals 311A, 312A, 311B, 312B, 315A in which the transmission distance consecutively increases.

Figure 5:
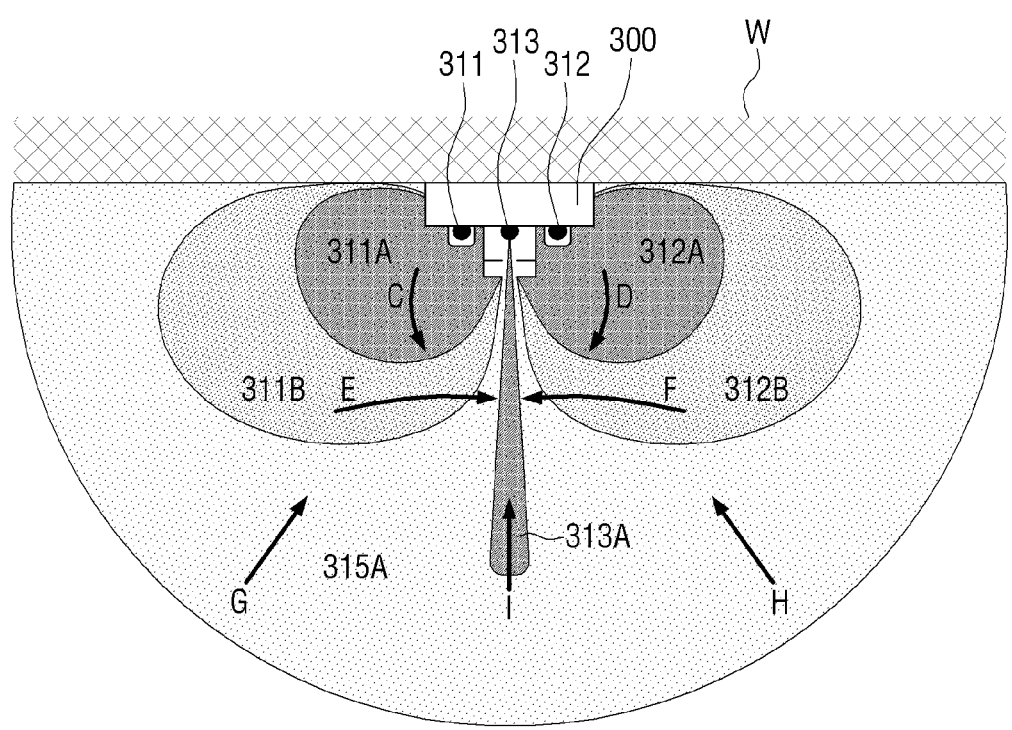
FIG. 5 is a schematic diagram of driving paths of the robot corresponding to the type of the received signals.

FIG. 5 is a schematic diagram of driving paths of the robot 100 corresponding to the type of the received signals.

Referring to FIG. 5, when at least one among the plurality of receiving sensors provided on the robot 100 receives the first distance signals 311A, 312A, the controller 130 may control the driver 140 to drive the robot 100 backward from the charging station 300, e.g, to drive the robot 100 away from the charging station 300. When the third distance signals 315A are received, the controller 130 may control the driver 140 to drive the robot 100 toward the charging station 300. Thus, when the first distance signals 311A, 312A having the smallest transmission distances are received by at least one among the plurality of receiving sensors, the robot 100 may drive away from the charging station 300, which reduces the risk of the robot 100 colliding against the charging station. Further, when the third distance signals 315A having the largest transmission distances are received, the robot 100 may drive toward the charging station 300, and quickly find the charging station 300.

Meanwhile, when at least two distance signals are received by at least one among the plurality of receiving sensors, the controller 130 may select the distance signals having the smallest transmission angles and distances. When any signals among the plurality of distance signals and the front signal 313A are received, the controller 130 may select the front signal 313A only, and control the driving according to only the selected signals. Thereby, when some receiving sensor receives the second distance signals 311B, 312B and another receiving sensor receives the first distance signals 311A, 312A, the controller 130 may select the first distance signals 311A, 312A, calculate the direction of the charging station 300 by using the selected first distance signals 311A, 312A, and control the driver 140 to drive the robot 100 toward the calculated direction. Further, when some receiving sensors receive one among the plurality of distance signals and some other receiving sensors receive the front signal 313A, the controller 130 may select the front signal 313A and calculate the direction of the charging station 300. The above method may be applied to any type of signals.

When the first distance signals 311A, 312A or the third distance signals 315A are received by at least one among the plurality of receiving sensors, the robot 100 may drive backward or forward in view of the direction of the charging station 300. Thus, the receiving sensors may receive the second distance signals 311B, 312B.

When the second distance signals 311B, 312B are received, the controller 130 may control the driver 140 so that the robot 100 searches the front signal 313A by front-turn driving toward the direction corresponding to the preset angle ($\theta_o$) based on the direction of the charging station 300. However, when the first distance signals 311A, 312A are continuously received by at least one among the plurality of receiving sensors while the second distance signals 311B, 312B are received, the controller 130 may control the driver 140 so that the robot 100 can drive backward from the direction of the charging station 300 until the first distance signals 311A, 312A are not received. The above will be explained in detail below.

When the front signal 313A is received by at least one among the plurality of receiving sensors, the controller 130 may ignore the other received distance signals and control the driver 140 so that the robot 100 drives toward the direction of the charging station 300 and connects to the charging station 300.

Figure 6A:
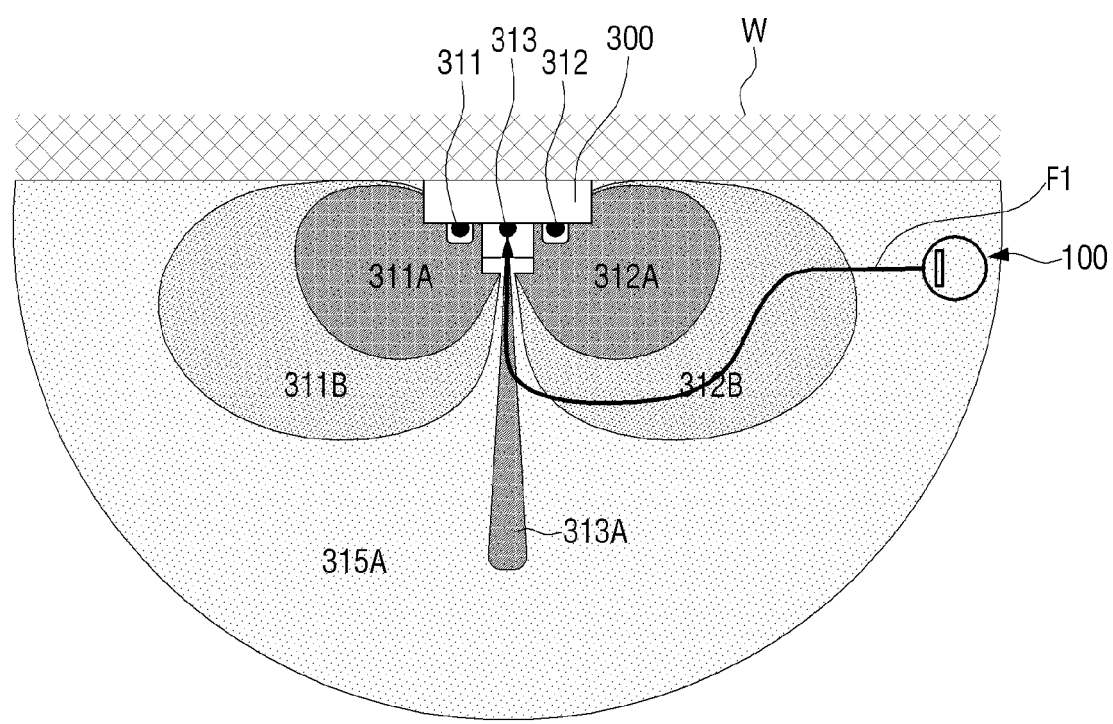
FIGS. 6A and 6B are schematic diagrams describing driving paths in which the robot connects to the charging station while consecutively receiving third and second distance signals, and front signals.
Figure 6B:
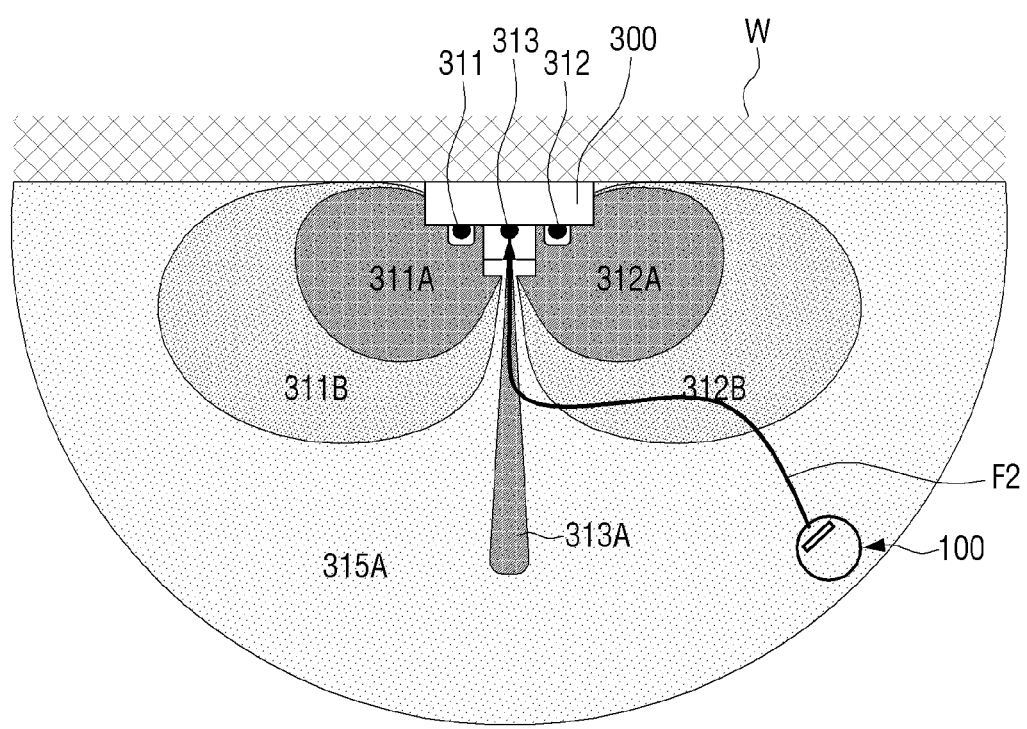
Figure 6C:
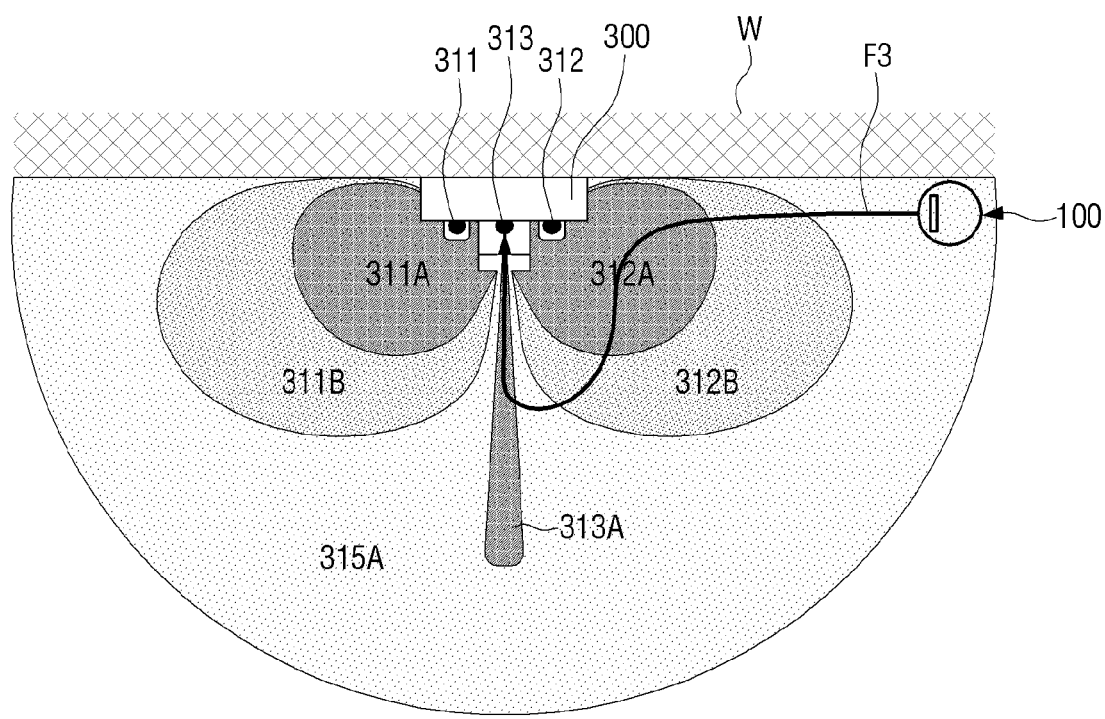
FIG. 6C is a schematic diagram of driving paths in which the robot connects to the charging station while consecutively receiving the third, the second and the first distance signals and the front signal.

FIGS. 6A to 6C are schematic diagrams describing driving paths in which the robot 100 may consecutively sense the plurality of distance signals and the front signal 313A and may connect to the charging station 300.

Referring to FIGS. 6A and 6B, when the robot 100 drives from the outer area of the transmission distances regarding the third distance signals 315A and the third distance signals 315A are received, the controller 130 may control the driver 140 so that the second distance signals 311B, 312B and the front signal 313A are consecutively received, and the robot 100 drives in a direction indicated by the arrows F1, F2 and quickly connects to the charging station, as described above.

Referring to FIG. 6C, when the robot 100 approaches the charging station 300 by tracking the wall in a direction indicated by the arrow F3 from outside the transmission distance regarding the third distance signals 315A, the distance signals may be received by the receiving sensors because of the sufficient transmission angles regarding the plurality of distance signals. Therefore, the controller 130 may control the driver 140 so that the robot 100 does not collide against the charging station 300 and can quickly connect to the charging station 300 by tracking the front signal 313A without receiving the distance signals.

Figure 7A:
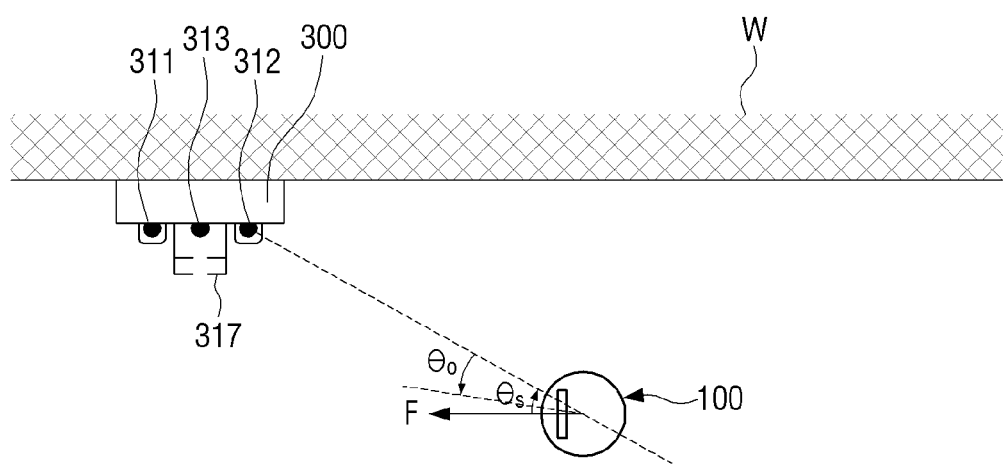
FIGS. 7A, 7B, and 7C are diagrams explaining relations between a preset angle and an angle of the charging station during reception of the second distance signals and driving.
Figure 7B:
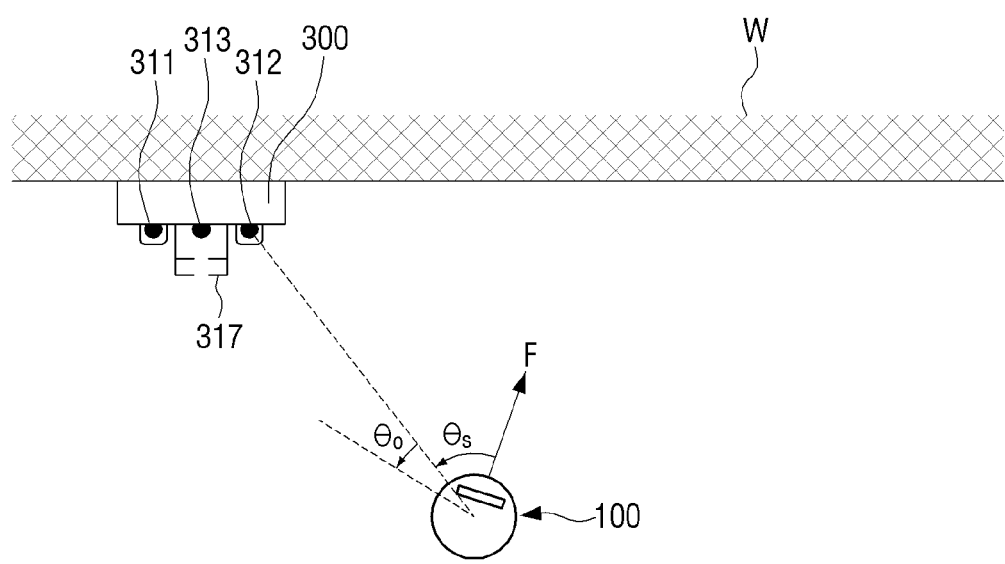
Figure 7C:
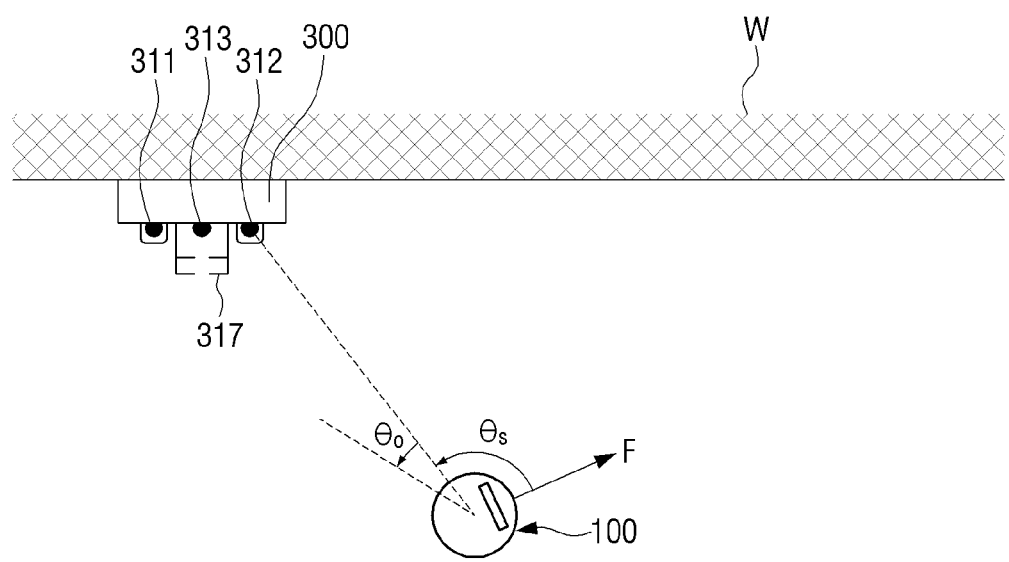

FIGS. 7A to 7C are diagrams explaining relations between the preset angle and the angle of the charging station 300 while the second distance signals 311B, 312B are received and the robot is driving.

Referring to FIGS. 7A to 7C, the direction of the charging station 300 may be determined by the angle of the charging station 300 calculated from the arrangement angles of the receiving sensors receiving the selected signals based on the front of the robot 100.

The angle of the charging station 300 may be calculated based on the front of the robot 100. Specifically, the angle of the charging station 300 may be calculated according to a following mathematical formula, Formula 1:

$$\theta_s = \frac{\sum_{i=1}^{N} \theta_i f(i)}{\sum_{i=1}^{N} f(i)} \quad \text{[Formula 1]}$$

where N is number of the receiving sensors, i is serial number of the receiving sensors, $\theta_i$ is arrangement angle of a receiving sensor at i times which is measured clockwise from the front center line of the robot 100 if i is odd number, or arrangement angle of a receiving sensor at i times which is measured counter-clockwise from the front center line of the robot 100 if i is even number, f(i)=1 if the receiving sensor at i times receives the selected signals, and f(i)=0 if the receiving sensor at i times does not receive the selected signals. Herein, $\theta_i$ is $-180° \leq \theta_i + 180°$ and $\theta_s$ is $-180° \leq \theta_s + 180°$ According to the above-described method, the angle of the charging station 300 may be calculated to be a specific angle clockwise or counter-clockwise based on the front of the robot 100. Thus, the controller 130 may determine the direction which rotates by specific angle clockwise or counter-clockwise based on the front of the robot 100 to be the direction of the charging station 300. The controller 130 may control the driver 140 so that the robot 100 drives based on the determined direction of the charging station 300.

Meanwhile, as described above, when the second distance signals 311B, 312B are received by the plurality of receiving sensors, the controller 130 may control the driver 140 so that the robot 100 performs the front-turn driving toward a direction corresponding to the preset angle ($\theta_o$) based on the direction of the charging station 300, and searches for the front signal 313A.

The preset angle ($\theta_o$) may be set within the range of $-180°$ to $+180°$. For example, when the second right distance signals are received, the preset angle ($\theta_o$) may be disposed based on the determined direction of the charging station 300, e.g., 30° counter-clockwise, thus, $-30°$. The preset angle ($\theta_o$) may have a fixed value until the robot 100 connects to the charging station 300. Therefore, the controller 130 may calculate the angle of the charging station 300 at preset periods, while the robot 100 receives the second distance signals 311B, 312B and drives, and control the driver 140 for the robot 100 to stop the front-turn driving and start the front-straight driving when the sum of the preset angle ($\theta_o$) and the angle regarding the charging station 300 becomes 0.

The term "front-turn driving" indicates that the robot 100 rotates and drives toward the front, and the term "front-straight driving" indicates that the robot 100 drives straight toward the front without rotating.

As illustrated in FIG. 7A, the angle of the charging station 300 calculated by the controller 130 while the robot 100 receives the second distance signals 311B, 312B and drives may be greater than the preset angle ($\theta_o$) and the direction may be opposite. Thus, the angle of the charging station 300 may be measured clockwise based on the front of the robot 100 and may have a positive value. Further, the preset angle ($\theta_o$) may be measured counter-clockwise based on the direction of the charging station 300 and may have a negative value. Thereby, the robot 100 may perform the front-turn driving toward the direction in which the calculated angle of the charging station 300 becomes 0°, i.e., the robot 100 may perform the front-turn driving clockwise. When the preset period comes while the front-turn driving, the controller 130 may calculate the angle of the charging station 300 again. Further, when the angle of the charging station 300 and the preset angle ($\theta_o$) are uniform with respect to each other in terms of the size, and when the directions are opposite of each other, i.e., when the sum of the angle regarding the charging station 300 and the preset angle ($\theta_o$) becomes 0, the controller 130 may control the driver 140 to stop the front-turn driving and start the front-straight driving.

Further, referring to FIG. 7B, the angle of the charging station 300 calculated by the controller 130 while the robot 100 receives the second distance signals 311B, 312B and drives may be greater than the preset angle ($\theta_o$) in terms of the size, and the direction may be uniform with respect to each other. Thus, the angle of the charging station 300 may be measured counter-clockwise based on the front of the robot 100, which may have a negative value. The preset angle ($\theta_o$) may be measured counter-clockwise based on the direction of the charging station 300, which may also have a negative value. Thereby, the robot 100 may perform the front-turn driving toward the direction in which the calculated angle of the charging station 300 become 0°, i.e., the robot 100 may perform the front-turn driving counter-clockwise. When the preset period comes while performing the front-turn driving, the controller 130 may calculate the angle of the charging station 300 again. When the robot 100 further performs the rotating counter-clockwise based on the direction of the charging station 300 by performing the front-turn driving counter-clockwise, the controller 130 may calculate the angle of the charging station 300 to have a positive value. In this process, when the sum of the preset angle ($\theta_o$) and the angle regarding the charging station 300 becomes 0, the controller 130 may control the driver 140 to stop the front-turn driving and perform the front-straight driving.

Meanwhile, FIG. 7C illustrates the angle of the charging station 300 in which the size of the angle is greater than the angle of the charging station 300 of FIG. 7B and the direction is uniform with respect to each other. In this case, the controller 130 may control the driver 140 to perform the front-turn driving with the preset angular velocity corresponding to the calculated angle of the charging station 300. For example, the controller 130 may control the driver 140 to perform the front-turn driving with the angular velocity in a size proportional to the size of the angle calculated regarding the charging station 300. When performing the driving by the angular velocity, the robot 100 may quickly drive toward the front signal 313A.

Figure 8:
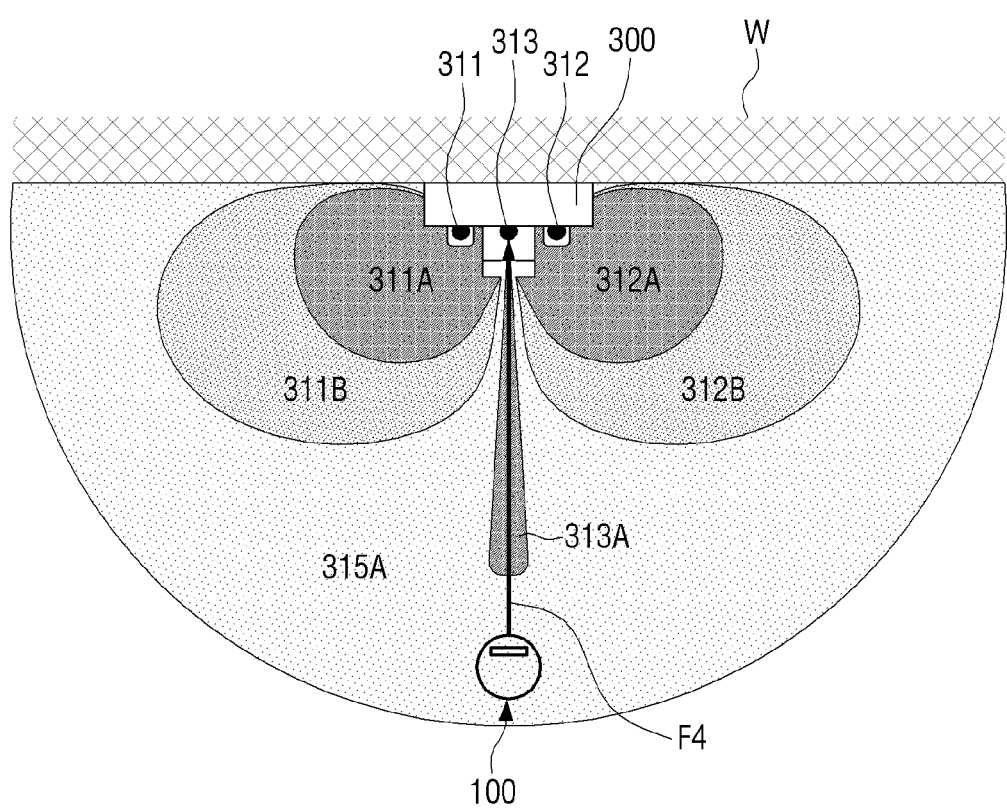
FIG. 8 is a schematic diagram of driving paths in which the robot connects to the charging station while consecutively receiving the third distance signals and the front signal.

FIG. 8 is a schematic diagram of driving paths in which the robot 100 may consecutively receive the third distance signals 315A and the front signal 313A, and use the received signals to return to or connect to the charging station 300.

Referring to FIG. 8, when the robot 100 drives from the outer area of the transmission distances regarding the third distance signals 315A and the front signal 313A are received, the controller 130 may select the front signal 313A and control the driver 140 so that the robot 100 tracks the front signal 313A and connects to the charging station 300, as described above.

Figure 9:
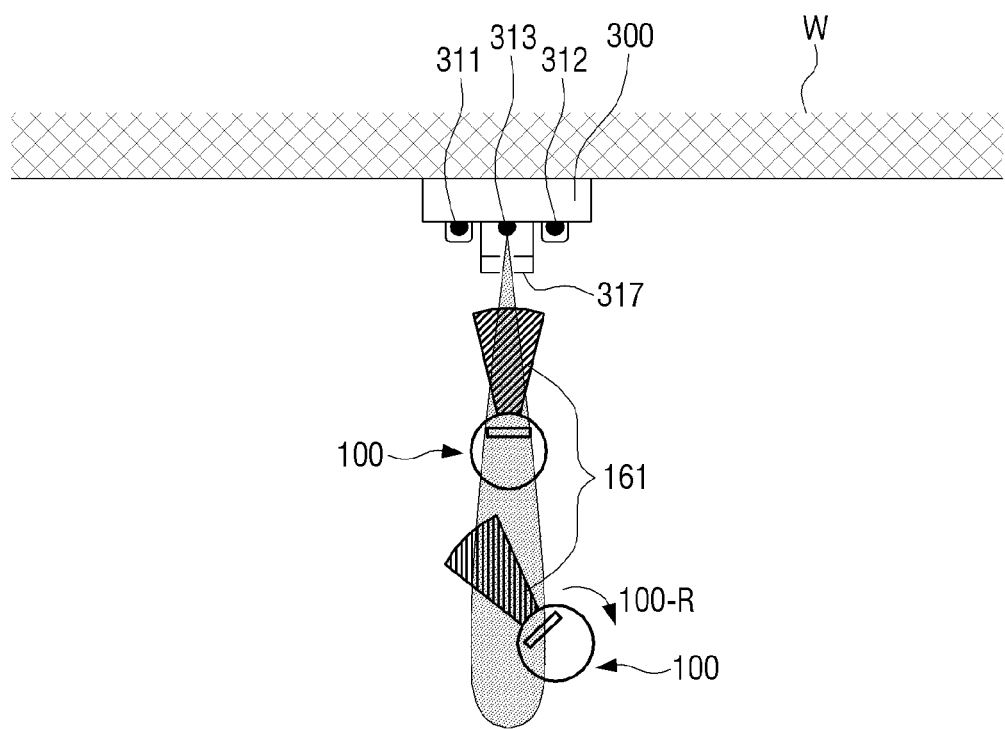
FIG. 9 is a schematic diagram of driving paths in which the robot connects to the charging station while receiving the front signal by using overlapping reception range regarding a pair of front receiving sensors.

FIG. 9 is a schematic diagram of driving paths in which the robot 100 may receive the front signal 313A by using the overlapping reception range regarding a pair of the front receiving sensors and return to or connect to the charging station 300.

Referring to FIG. 9, when the front signal 313A is received by any one among a pair of the front receiving sensors 111, 116, the controller 130 may determine the direction of the charging station 300 by using the arrangement angle of the receiving sensor to receive the front signal 313A, and control the driver 140 so that the robot 100 performs front-turn driving, which includes rotating toward the arrowed direction, as described above. When the front signal 313A is received by a pair of the front receiving sensors 111, 116 together, in other words, when the front signal 313A is positioned within the overlapping reception range regarding a pair of the front receiving sensors, the robot 100 may control the driver 140 for the robot 100 to stop front-turn driving and perform front-straight driving.

The method for redocking or returning of the robot 100 will be explained below by referring to FIG. 10.

Figure 10:
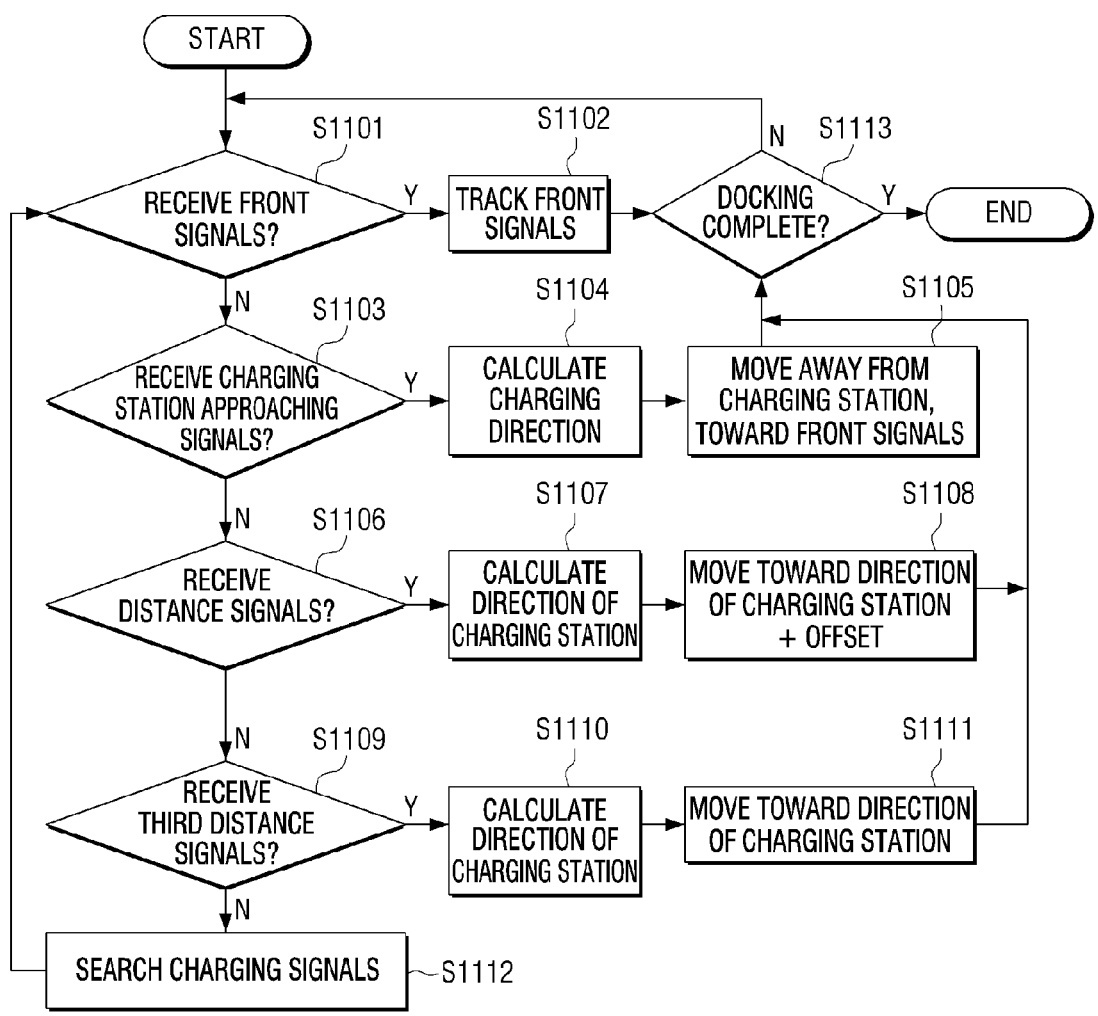
FIG. 10 is a flowchart provided to explain a method in which the robot returns to the charging station.

FIG. 10 is a flowchart provided to explain the method in which the robot 100 may return to the charging station 300. First, at S1101, the controller 130 may determine whether the front signal 313A is received or not.

When the front signal 313A is received at S1101-Y, the robot 100 may track the front signal 313A at S1102, and the controller 130 may determine whether to connect to the charging station 300 at S1113.

When the connecting to the charging station 300 is performed at S1113-Y, the robot 100 may complete the driving. When the connecting to the charging station 300 has not been performed at S1113-N, the controller 130 may determine again whether the front signal 313A is received or not, at S1101.

When the front signal 313A is not received at S1101-N, the controller 130 may determine whether the first distance signals 311A, 312A are received or not, at S1103.

When the first distance signals 311A, 312A are received at S1103-Y, the controller 130 may calculate the direction of the charging station 300, at S1104, and determine whether to connect to the charging station 300, at S1113, after the robot 100 drives backward from the direction of the charging station 300, at S1105.

When the first distance signals 311A, 312A are not received at S1103-N, the controller 130 may determine whether the second distance signals 311B, 312B are received or not, at S1106.

When the second distance signals 311B, 312B are received at S1106-Y, the controller 130 may calculate the direction of the charging station 300, at S1107, and determine whether to connect to the charging station 300, at S1113, after the robot 100 performs the front-turn driving toward direction corresponding to the preset angle ($\theta_o$) based on the direction of the charging station 300, at S1108.

When the second distance signals 311B, 312B are not received at S1106-N, the controller 130 may determine whether the third distance signals 315A are received or not, at S1109.

When the third distance signals are received at S1109-Y, the controller 130 may calculate the direction of the charging station 300, at S1110, and determine whether to connect to the charging station 300, at S1113, after the robot 100 drives toward the direction of the charging station 300.

When the third distance signals 315A are not received at S1109-N, the controller 130 may search transmitting signals, at S1112, and repeatedly determine whether the front signal 313A is received, at S1101.

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

What is claimed is:

1. An apparatus for returning a robot to a charging station, the apparatus comprising:
   a signal transmitter disposed on the charging station to transmit a plurality of signals to determine a distance of the robot from the charging station, the plurality of signals including a single narrow signal having a narrow transmission angle and a plurality of distance signals each having a wider transmission angle than the single narrow signal comprising a first distance signal, a second distance signal, and a third distance signal in which a respective transmission distance of the plurality of distance signals from the charging station consecutively increases;
   a signal receiver disposed on the robot and comprising a plurality of receiving sensors to receive the plurality of signals;
   at least one memory storing instructions; and
   a controller including at least one processor that executes the instructions stored in the at least one memory to:
      calculate an angle of the charging station with respect to the robot by using any among the single front signal and the plurality of distance signals as received, and
      control a driving of the robot so that the robot returns to the charging station using the calculated angle with respect to the charging station,
   wherein based on which ones of the plurality of signals are received by at least one among the plurality of receiving sensors, the controller controls the robot to:
      drive away from the charging station when the first distance signal is received,
      drive toward the charging station when the only distance signal received is the third distance signal,
      perform a front-turn driving toward a direction corresponding to a preset angle based on a direction of the charging station with respect to the robot and searches for the single narrow signal when the only distance signal received is the second distance signal, and
   drive toward the direction of the charging station and connect to the charging station when only the single narrow signal is received.

2. The apparatus of claim 1, wherein the plurality of receiving sensors are arranged on a boundary of the robot symmetrically from left to right with respect to a front of the robot.

3. The apparatus of claim 2, wherein the plurality of receiving sensors have preset reception ranges.

4. The apparatus of claim 2, wherein the plurality of receiving sensors are arranged on the boundary of the robot at equal intervals with respect to each other.

5. The apparatus of claim 2, wherein the plurality of receiving sensors comprise a pair of front receiving sensors arranged in parallel on the front of the robot in which the reception ranges overlap with each other.

6. The apparatus of claim 1, wherein, when a plurality of distance signals are received by some among the plurality of receiving sensors, a signal among the received plurality of distance signals having a smallest transmission angle and a distance is selected by the controller and the controller controls the robot according to the selected signal, and
   when more than one of the plurality of distance signals and the single narrow signal are received by some among the plurality of receiving sensors, only the single narrow signal is selected by the controller and the controller controls the robot according to the selected single narrow signal.

7. An apparatus for returning a robot to a charging station, the apparatus comprising:
   a signal transmitter disposed on the charging station to transmit a plurality of signals to determine a distance of the robot from the charging station, the plurality of signals including a single narrow signal having a narrow transmission angle and a plurality of distance signals each having a wider transmission angle than the single narrow signal comprising a first distance signal, a second distance signal, and a third distance signal in which a respective transmission distance of the plurality of distance signals from the charging station consecutively increases;
   a signal receiver disposed on the robot and comprising a plurality of receiving sensors to receive the plurality of signals;
   at least one memory storing instructions; and
   a controller including at least one processor that executes the instructions stored in the at least one memory to:
      calculate an angle of the charging station with respect to the robot by using any among the single front signal and the plurality of distance signals as received, and
      control a driving of the robot so that the robot returns to the charging station using the calculated angle with respect to the charging station,
   wherein based on which ones of the plurality of signals are received by at least one among the plurality of receiving sensors, the controller controls the robot to:
      drive away from the charging station when the first distance signal is received,
      drive toward the charging station when the only distance signal received is the third distance signal,
      perform a front-turn driving toward a direction corresponding to a preset angle based on a direction of the charging station with respect to the robot and searches for the single narrow signal when the only distance signal received is the second distance signal, and
      drive toward the direction of the charging station and connect to the charging station when only the single narrow signal is received,
   wherein the single narrow signal, the first distance signal, the second distance signal, and the third distance signal have different codes from each other, the single narrow signal is transmitted from the center of the charging station toward the front of the apparatus, and the first, the second and the third distance signals are each formed symmetrically from left to right of the apparatus with respect to the single narrow signal.

8. The apparatus of claim 7, wherein the first distance signal and the second distance signal have different codes between the signals formed on one side and the signals formed on other side of the single narrow signal.

9. The apparatus of claim 8, wherein the third distance signal comprises a transmission angle covering both sides of the charging station.

10. The apparatus of claim 1, wherein the first to the third distance signals have overlapping areas with respect to each other, and the controller selects the distance signal having the smallest transmission distance when at least two distance signals are received by at least one among the plurality of receiving sensors, selects the single narrow signal only when any one among the plurality of distance signals and the single narrow signal is received, and controls a driver of the robot according to the selected signal.

11. The apparatus of claim 1, wherein the single narrow signal and the plurality of distance signals are infrared signals.

12. A method for returning a robot to a charging station, the method comprising:

determining whether returning conditions are met according to at least one of a determined charging amount of a battery and a determined amount of dust obtained by the robot;

when the determined returning conditions are met, searching any one among a plurality of signals received by the charging station to determine a distance of the robot from the charging station, the plurality of signals transmitted from the charging station including a single narrow signal and a plurality of distance signals including a first distance signal, a second distance signal and a third distance signal in which a transmission distance of the plurality of distance signals from the charging station consecutively increases;

driving the robot away from the charging station when the first distance signal is received by at least one among a plurality of receiving sensors provided on the robot;

driving the robot toward the charging station when only the third distance signal of the plurality of distance signals is received by the at least one among a plurality of receiving sensors provided on the robot;

front-turn driving the robot toward a direction corresponding to a preset angle ($\theta_o$) based on a direction of the charging station and searching for the single narrow signal when the second distance signal is received by the at least one among the plurality of receiving sensors; and driving the robot toward the direction of the charging station and connecting the robot to the charging station when only the single narrow signal is received by the at least one among the plurality of receiving sensors.

13. The method of claim 12, wherein the first distance signal, the second distance signal, and the third distance signal have overlapping areas with respect to each other, the distance signal of the plurality of distance signals having a smallest transmission angle and distance is selected when at least two of the plurality of distance signals are received by at least one among the plurality of receiving sensors, or only the single narrow signal is selected when any one among the plurality of distance signals and the single narrow signal are received, and driving is performed according to the selected signal.

14. The method of claim 13, wherein the direction of the charging station is determined according to an angle of the charging station calculated by an arrangement angle from a front center line of the robot to the receiving sensor which receives the selected signal.

15. The method of claim 14, wherein the direction of the charging station is repeatedly determined at a preset calculating period from a time when at least one among the plurality of receiving sensors provided on the robot receives the single narrow signal and any one among the plurality of distance signals comprising the first to the third distance signals to a time when the robot connects to the charging station.

16. The method of claim 14, wherein the plurality of receiving sensors are arranged on the boundary of the robot symmetrically from left to right with respect a front of the robot, and the angle ($\theta_s$) of the charging station is calculated according to a following mathematical formula 1

$$\theta_s = \frac{\sum_{i=1}^{N} \theta_i f(i)}{\sum_{i=1}^{N} f(i)}$$ [Formula 1]

where N is number of the receiving sensors, i is serial number of the receiving sensors, $\theta_i$ is angle of a receiving sensor at i times which is measured clockwise from the front center line of the robot if i is odd number, or angle of a receiving sensor at i times which is measured counter-clockwise from the front center line of the robot if i is even number, f(i)=1 if the receiving sensor at i times receives the selected signals, and f(i)=0 if the receiving sensor at i times does not receive the selected signals, wherein $\theta_i$ is $-180° \le \theta_i \le 180°$ and $\theta_s$ is $-180° \theta_s \le 180°$.

17. The method of claim 16, wherein the preset angle ($\theta_o$) is established within a range from $-180°$ to $+180°$, and when the second distance signal is received by some among the plurality of receiving sensors provided on the robot, the robot performs a front-straight driving if the angle of the charging station is uniform to the preset angle in terms of size, and the direction is different from each other.

18. The method of claim 14, wherein the front-turn driving is performed according to a preset angular velocity corresponding to the calculated angle of the charging station.

19. The method of claim 18, wherein the front-turn driving is performed according to an angular velocity proportional to a size of the calculated angle of the charging station.

* * * * *